United States Patent
LaVeigne et al.

(10) Patent No.: US 9,078,333 B2
(45) Date of Patent: Jul. 7, 2015

(54) EXTENDED DYNAMIC RANGE DRIVE CIRCUIT FOR EMITTER ARRAYS

(71) Applicants: Joseph D LaVeigne, Buellton, CA (US); Fouad Kiamilev, Hockessin, DE (US); Rodney McGee, Georgetown, DE (US); Nicholas Waite, Wilmington, DE (US)

(72) Inventors: Joseph D LaVeigne, Buellton, CA (US); Fouad Kiamilev, Hockessin, DE (US); Rodney McGee, Georgetown, DE (US); Nicholas Waite, Wilmington, DE (US)

(*) Notice: Subject to any disclaimer, the term of this patent is extended or adjusted under 35 U.S.C. 154(b) by 0 days.

(21) Appl. No.: 14/298,916

(22) Filed: Jun. 7, 2014

(65) Prior Publication Data
US 2014/0367593 A1 Dec. 18, 2014

Related U.S. Application Data

(60) Provisional application No. 61/835,516, filed on Jun. 14, 2013.

(51) Int. Cl.
*H05B 41/38* (2006.01)
*H05B 41/44* (2006.01)
*H04N 5/33* (2006.01)

(52) U.S. Cl.
CPC .............. *H05B 41/38* (2013.01); *H04N 5/33* (2013.01); *H05B 41/44* (2013.01)

(58) Field of Classification Search
None
See application file for complete search history.

(56) References Cited

U.S. PATENT DOCUMENTS

| 6,316,777 | B1 * | 11/2001 | Parrish et al. | 250/495.1 |
| 6,465,798 | B1 * | 10/2002 | Hoelter et al. | 250/495.1 |
| 7,495,220 | B2 * | 2/2009 | Blackwell et al. | 250/338.1 |
| 2006/0044546 | A1 * | 3/2006 | Lewin et al. | 356/4.04 |
| 2007/0177011 | A1 * | 8/2007 | Lewin et al. | 348/118 |
| 2010/0327918 | A1 | 12/2010 | Curzan | |

OTHER PUBLICATIONS

Design Considerations for a High-Temperature, High-Dynamic Range IRSP, Joe LaVeigne, Breck Sieglinger, Proc. SPIE 8356, Technologies for Synthetic Environments: Hardware-in-the-Loop XVII, 83560G (May 1, 2012); doi:10.1117/12.922984.
European Search Report dated Nov. 26, 2014 from 14172269.4-1502 / 2814240 (6 pages).

* cited by examiner

*Primary Examiner* — Crystal L Hammond
(74) *Attorney, Agent, or Firm* — Gerald E Linden

(57) ABSTRACT

Drive circuit (100, 200, 300, 400) for LED thermal emitters in pixel elements of an infrared scene projector (IRSP). At least two current sources (Q1, Q2, Q5) provide output currents (I1, I2, I3) which may be summed and provided to a single LED (150), or provided independently to two or more LEDs (450A, 450B). The current sources may have different gains (G1, G2, G3), and different turn-on voltages (Voffset). This allows for different resolutions for different ranges of apparent temperatures, such as high resolution in a low range and low resolution in a high range, thereby facilitating a digital implementation of the drive circuit(s).

15 Claims, 5 Drawing Sheets

EXTENDED DYNAMIC RANGE DRIVE CIRCUIT FOR EMITTER ARRAYS

CROSS-REFERENCE TO RELATED APPLICATION(S)

This is a non-provisional filing of U.S. 61/835,516 filed 14 Jun. 2013.

TECHNICAL FIELD

The invention relates broadly to infrared scene projection systems (IRSPs) and, more particularly to IRSPs using LEDs (light-emitting diodes) as thermal emitters and, more particularly to driver circuits ("drivers") for the LEDs.

BACKGROUND

In general, infrared (IR) radiation may have a range of wavelengths of 0.8-20 μm or larger though the most common wavelengths uses for thermal imagery are 3-5 um (commonly known as the mid-wave IR band or MWIR) and 8-12 μm (commonly known as the long-wave IR band or LWIR).

The human eye cannot detect infrared light. But infrared energy can be detected electronically. Sophisticated electronic instruments exist which can scan a scene and convert the infrared light to an electrical signal which can be displayed on a video monitor, analyzed by a computer, or recorded on film. Electrically, the output of these instruments is very similar to the output of a conventional video camera.

IR imaging systems are designed to satisfy different performance parameters, depending on their intended use. Military applications, such as missile guidance, require the highest level of accuracy and reliability.

Due to their complexity, IR imaging systems are expensive, sensitive, high-maintenance devices. To assure proper operation of these systems and to achieve their full performance requires frequent test and calibration. Engineers, who design IR imaging systems, test them during the design and development stage to evaluate performance parameters and to refine designs to optimize performance. Manufacturers of IR imaging systems need to compare actual performance to specifications, and need to calibrate the systems prior to delivery. End users must test their systems regularly to verify proper operation, and must recalibrate them periodically while they are in the working environment.

Some of the important performance characteristics of an IR imaging system are spatial resolution (ability to resolve fine detail), thermal resolution (ability to resolve small temperature differences), speed (ability to respond to a rapidly changing scene without blurring), and dynamic range (how large a temperature span it can view without saturating). Standard tests have been developed to quantify these characteristics.

IR Test Equipment

Setup, test, and calibration of IR imaging systems requires the use of specialized test equipment. This test equipment is designed to create an infrared scene of precisely known characteristics, to project this scene to the input of the IR imaging system being tested, and to evaluate the quality of the output of the IR imaging system.

Infrared Scene Projector (IRSP)

Over the past three decades, infrared scene projection has evolved into a critical laboratory tool for evaluation of high-performance infrared imagers and their embedded algorithms. This technology projects accurate, realistic and dynamic IR scenes into the entrance aperture of the sensor being tested. It is used to simulate the operating environment of various systems, including imaging infrared missile seekers, search and track systems, and thermal imagers. Using it for hardware-in-the-loop simulation has reduced the scope and cost of flight/field testing, while enabling a new level of sensor optimization. Hardware-in-the-loop simulation enables the generation of synthetic IR imagery for laboratory evaluation of high-performance electro-optical systems.

An Infrared Scene Projector (IRSP) may be used to test a wide variety of sensors used by the US military and major defense contractors. Generally, an IRSP comprises a large number of thermal (IR) emitters, arranged in an array of pixel elements, such as 1024×1024 pixel elements.

The IRSP may use a single chip IR emitter array to produce actual thermal imagery. The emitter array utilizes a large number of pixels to generate the image (similar to how a digital camera uses a large number of pixels to capture an image). Each pixel emits thermal energy that is ultimately captured by the sensor under test. There are many types of emitters such as resistive bridges, Light Emitting Diodes (LEDs), lasers, deformable membranes, micro mirror arrays, etc. Of these emitter types, resistive bridge arrays and micro mirrors are the most widely used. Resistive bridges may offer the best performance in terms of temperature range, speed (frame rate and thermal transition time) and thermal resolution.

LEDs as Pixel Elements in an IRSP

A light-emitting diode (LED) is a two-lead semiconductor light source that resembles a basic pn-junction diode, except that an LED also emits light. When an LED's anode lead has a voltage that is more positive than its cathode lead by at least the LED's forward voltage drop, current flows. Electrons are able to recombine with holes within the device, releasing energy in the form of photons. This effect is called electroluminescence, and the color of the light (corresponding to the energy of the photon) is determined by the energy band gap of the semiconductor. The earliest LEDs emitted low-intensity infrared light. Infrared LEDs are still frequently used as transmitting elements in remote-control circuits, such as those in remote controls for a wide variety of consumer electronics. The current-voltage characteristic of an LED is similar to other diodes, in that the current is dependent exponentially on the voltage (see Shockley diode equation). This means that a small change in voltage can cause a large change in current. If the applied voltage exceeds the LED's forward voltage drop by a small amount, the current rating may be exceeded by a large amount, potentially damaging or destroying the LED. The typical solution is to use constant-current power supplies to keep the current below the LED's maximum current rating. And the typical solution to dimming (reducing) the output of an LED is to use pulse width modulation (PWM).

Light emitting diodes (LEDs) are currently in development as sources for infrared scene projection systems (IRSPs). LEDs offer some advantages over other thermal emitters (such as resistive elements), including potentially higher apparent temperatures and tunable output wavelength. However, implementing a high (extended) dynamic range IRSP, covering multiple orders of magnitude of radiance can be difficult to implement with an LED-based thermal emitter using a standard LED driver circuit (or drive circuit, or simply "driver"). (For purposes of the discussions set forth herein, LEDs may be considered to be a type of "thermal emitter".)

High-Temperature, High-Dynamic Range IRSP

Attention is directed to Design Considerations for a High-Temperature, High-Dynamic Range IRSP, Joe LaVeigne, Breck Sieglinger, Proc. SPIE 8356, Technologies for Synthetic Environments: Hardware-in-the-Loop XVII, 83560G (May 1, 2012); doi:10.1117/12.922984, incorporated by reference herein. As disclosed therein, Achieving very high apparent temperatures is a persistent goal in infrared scene projector (IRSP) design. Several programs are currently under way to develop technologies for producing high apparent temperatures. Producing a useful system capable of reproducing high fidelity scenes across a large range of apparent temperatures requires more than just a high temperature source. The entire scene projection system must support the extended dynamic range of the desired scenarios. Supporting this extended range places requirements on the rest of the system. System resolution and non-uniformity correction (NUC) are two areas of concern in the development of a high dynamic range IRSP.

Among other qualities, high radiance or apparent temperature is desired for many IR scene projector applications. Current state of the art resistive arrays can achieve apparent temperatures up to 700° K in the 3-5 um band. New technologies are currently under development with the goal achieve temperatures in excess of 2000° K using high temperature materials for resistive arrays or other sources using narrow band emission. While there has been considerable effort applied to the development of these technologies with the basic goal of being capable of producing very high apparent temperatures, there has been less of a focus on the system level aspects of a high dynamic range projector. Although producing higher temperatures is a worthy goal, a practical IRSP system must also produce accurate radiance with high fidelity at low apparent temperatures as well.

System level resolution and non-uniformity correction (NUC) are two areas of concern. Resolution becomes more of a challenge as the maximum apparent temperature of the system increases. This is primarily due to the nonlinear relationship between apparent temperature and radiance. A system with a maximum apparent temperature of 2000° K has a MWIR (mid-wave IR band) output radiance 40 times higher than one with a 700° K maximum apparent temperature. The 40 times larger radiance at 2000° K means a system that can achieve that radiance will require a higher fidelity by that same factor in order to simulate low temperature objects with the same absolute resolution. The resolution of the system is set by that component or algorithm which has the lowest resolution and may be dependent on the radiance being commanded.

The apparent temperature of an object is defined as the temperature of a blackbody that produces the equivalent integrated radiance over the band of interest. The Planck Function shown in Equation 1 describes the radiance of a blackbody.

$$L(\lambda, T) = \frac{2hc^2}{\lambda^5(e^{hc/\lambda kT} - 1)} d\lambda \quad [1]$$

Consider a system that is linear in radiance with the requirement to have a minimum resolution of 0.1° K at an apparent temperature of 300° K. Such a system would be capable of producing a reasonable simulation of a typical ambient environment, though it would be far from the ~15 mK (milliKelvins) Noise Equivalent Temperature Difference (NETD) of a typical mid-wave infrared (MWIR) imager. A 0.1° K step at 300K is equivalent to a radiance of $6.8 \times 10^{-7}$ W/(cm$^2$sr) in the 3-5 MWIR band. If that same projection system were to be capable of a maximum apparent temperature of 2000° K, the system would require approximately 8 million steps, or nearly 23 bits of resolution. Scene projectors are also used to depict scenes with a space background. To achieve this, the projectors are typically operated inside a cryogenic chamber at temperatures near 100° K (−173° C.) or lower. For these low background situations the resolution needed for practical simulation is comparable to that of the camera, approaching 25 bits, or 40 million steps.

Current scene projectors are designed as 16 bit systems and typically operate linear in radiance. Without changes, these systems would not be acceptable for a high apparent temperature array. For example, a 16 bit linear system with a 2000° K maximum MWIR apparent temperature would have a step size at 300° K of over 20° K, making the system impractical for the simulation of typical terrestrial temperature scenes.

For a system with a 2000° K MWIR maximum apparent temperature, the native resolution will become coarser assuming a similar digital to analog converter (DAC) with an effective resolution of 14 to 15 bits is used. The predicted resolution for such a system is shown in FIG. 3. Though the step size is larger than existing arrays, it does not exceed 0.1° K until nearly 500° K. Based on these predictions, a 14 bit native resolution for a resistive array would be adequate depicting low radiance scenes. FIG. 3 also contains a plot of the resolution of the same system after a 16 bit linearization has been applied. In this case, the step size near ambient temperatures increases to 10° K or more. Such a coarse resolution is not acceptable for low radiance scenes. In order to operate with a response that is linear in radiance, a different representation must be used in the system. This will lead to new firmware and potentially new hardware being developed to support the new representation. A 24 bit fixed point number would be just acceptable for a MWIR projector with a 2000° K maximum temperature. A floating point representation would also be acceptable. Given the flexibility of the floating point representation for future growth, it is the recommended format for the next generation for control electronics.

The resolution issues described above apply to any emitter array. Consider a light emitting diode (LED) based array. In that case the native radiance versus drive function is much closer to being linear than the resistive arrays. If the native bit depth of a system based on a LED emitter array is 16 bits, then that will set the limit on the system resolution. For high temperature LED arrays, a higher resolution circuit at low radiance levels will be required in order to simulate low radiance scenes. The issues with digital micro-mirror devices (DMDs) are related. For a DMD to produce adequate resolution it must be capable of flipping back and forth very rapidly. For a 23 bit system operating at 400 Hz, in order to display a single bit of radiance, the minors would have to switch at over 3 GHz. This is far beyond the maximum mirror frequency of nearly 100 MHz for DMD devices currently in use.

Another solution would be to use an analog input, but this option also has complications. (An analog solution may have infinite resolution, but is limited by noise.) Assuming the read-in-integrated-circuit (RIIC) has a 0-5V input range, the smallest step size would be 5V/($8 \times 10^6$) or less than 1 µV. Typical high speed DACs (digital-to-analog converters) have noise levels on the order of 10's of µV, making an analog system comparable in complexity to a digital system. Although the range of radiance is very large, the absolute resolution required is not the same over the entire range of the projector. The relative radiance resolution required is on the order of 0.5% of the projected value (radiance emitted by a pixel). In this case, adequate resolution could be achieved with a 16-bit system if a non-linear radiance versus drive were used.

SUMMARY

It is a general object of the invention to provide improved digital techniques for driving LEDs and, more particularly, in the context of a high (wide, extended) dynamic range IRSP, capable of covering multiple (such as a minimum of 6 or 7) orders of magnitude of radiance, and capable of providing high (such as $1/10°$ K) resolution at 2000° K apparent temperature.

As used herein, a "drive circuit" (or "driver circuit"), or simply "driver", may refer an electrical circuit or other electronic component used to control another circuit or other component, such as a high-power transistor. An amplifier can be considered a driver for loudspeakers. In a transistor power amplifier, typically the driver circuit requires current gain.

The term "gain" typically refers to a measure of the ability of a circuit (often an amplifier) to increase the power or amplitude of a signal from the input to the output by adding energy converted from some power supply to the signal. It is usually defined as the mean ratio of the signal output of a system to the signal input of the same system. As used herein, the term "gain" may refer to a transfer function of a circuit or component which provides an output current ($I_{out}$) in response to an input voltage ($V_{in}$).

As used herein, "dynamic range", abbreviated DR or DNR, may refer to the ratio between the largest and smallest possible values of a changeable quantity, such as in signals like sound and light. It is measured as a ratio, or as a base-10 (decibel) or base-2 (doublings, bits or stops) logarithmic value.

As used herein, "orders of magnitude" may refer to how much larger one quantity is than another. If one quantity is about ten times more than the other, it may be said that they differ by one order of magnitude. If one number is abut one hundred times the other, it may be said that they differ by two orders of magnitude. Two numbers of the same order of magnitude have roughly the same scale: the larger value is less than ten times the smaller value.

As used herein, "multiple orders of magnitude" may refer to a range of quantities that varies, from smallest to largest, by at least one hundred times, or more, such as 10 million times (7 orders of magnitude).

As used herein, "resolution" may refer to the precision with which one quantity can vary from another, or the smallest change required to increment from one quantity to a next highest quantity.

Some circuit designs for drivers for LEDs that overcome the resolution limitations of a typical digital LED driver circuit are disclosed herein, such as may be incorporated in LED-based infrared scene projection systems (IRSPs).

According to the invention, generally, drive circuits are provided for LED thermal emitters in pixel elements of an infrared scene projector (IRSP). At least two current sources (Q1, Q2, Q5) provide output currents (I1, I2, I3) which may be summed and provided to a single LED (per pixel), or provided independently to two or more LEDs (pre pixel) 450B). The current sources may have different gains (G1, G2, G3), and different turn-on voltages (Voffset). This allows for different resolutions for different ranges of apparent temperatures, such as high resolution in a low range and low resolution in a high range, thereby facilitating a digital implementation of the drive circuit(s).

According to some embodiments (examples) of the invention, a drive circuit for an LED-based thermal emitter of an infrared scene projector (IRSP) may comprise: an input line for receiving a voltage input (Vin); at least one output line for providing corresponding at least one output current to at least one LED in a pixel of the IRSP; a first transistor (Q1) having a first gain (G1) and providing a first output current to the at least one LED in response to the voltage input (Vin); and a second transistor (Q2) having a second gain (G2) and providing a second output current to the at least one LED in response to the voltage input (Vin); wherein: the second gain (G2) of the second transistor (Q2) is larger than the first gain (G1) of the first transistor (Q1); and a first offset voltage (Voffset) is applied to the second transistor (Q2) to establish a first breakpoint between a low end range of apparent temperatures with high resolution and a higher range of apparent temperatures with lower resolution. The second gain (G2) may be at least 10 times larger than the first gain (G1). The second transistor (Q2) may comprise a plurality of transistors. The drive circuit may further comprise: a third transistor (Q5) having a third gain (G3) and providing a third output current (I3) in response to the voltage input (Vin). The first offset voltage (Voffset) may establish the first breakpoint between a low end range and a medium range of apparent temperatures; and a second offset voltage (Voffset2) may establish a second breakpoint between the medium range and a high end range of apparent temperatures. At least one of the first and second offset voltages may be established by at least one diode-connected transistor. The first offset voltage may be established by a voltage source. The LED may function as a thermal emitter pixel of an infrared scene projection system (IRSP), wherein there may be a plurality of LEDs and a corresponding plurality of pixels; the IRSP has a range of apparent temperatures; and the offset voltage establishes/separates a low end range of apparent temperatures from a high end range of apparent temperatures. The IRSP may exhibits a high resolution in the low end range of apparent temperatures and exhibits a relatively low resolution in the low end range of apparent temperatures. The low end range of apparent temperatures may be below 400° K; and the high end range of apparent temperatures may be above 400° K.

At least one pixel of the IRSP may comprise at least two LEDs. The first and second output currents may be provided individually to selected ones of the at least two LEDs. Selected ones of the at least two LEDs may be driven by its own driver stage. One of the at least two LEDs may be larger than another of the at least two LEDs.

According to some embodiments (examples) of the invention, a method of driving at least one thermal emitter of an infrared scene projector (IRSP) may comprise: driving the at least one thermal emitter in a first range of apparent temperatures with high resolution; and driving the at least one thermal emitter in a higher range of apparent temperatures with lower resolution. The at least one thermal emitter may comprise one or more LEDs.

Other embodiments (examples) may be disclosed, and may be claimed. Some interim products may be disclosed, and may be claimed.

The invention(s) described herein may relate to industrial and commercial industries, such as thermal imaging, infrared scene projectors (IRSPs), and the like.

Other objects, features and advantages of the invention(s) disclosed herein may become apparent in light of the following illustrations and descriptions thereof.

BRIEF DESCRIPTION OF THE DRAWINGS

Reference will be made in detail to embodiments of the disclosure, non-limiting examples of which may be illustrated in the accompanying drawing figures (FIGs). The figures may generally be in the form of diagrams. Some elements in the figures may be exaggerated or drawn not-to-scale, others may be omitted, for illustrative clarity. Some figures may be in the form of diagrams. Some of the figures presented herein may be in the form of schematic diagrams, utilizing convention symbols for transistors, voltage sources and the like. Additionally, conventional references such as "Q1", "Q2", Q3" and the like (for transistors), may be used in lieu of reference numerals. Any text (legends, notes, reference numerals and the like) appearing on the drawings are incorporated by reference herein.

Although the invention may be illustrated in the context of various exemplary embodiments, it should be understood that it is not intended to limit the invention to these particular embodiments, and individual features of various embodiments may be combined with one another.

DESCRIPTION

Various embodiments will be described to illustrate teachings of the invention(s), and should be construed as illustrative rather than limiting. It should be understood that it is not intended to limit the invention(s) to these particular embodiments. It should be understood that some individual features of various embodiments may be combined in different ways than shown, with one another. Reference herein to "one embodiment", "an embodiment", or similar formulations, may mean that a particular feature, structure, operation, or characteristic described in connection with the embodiment may be included in at least one embodiment of the present invention.

The embodiments and aspects thereof may be described and illustrated in conjunction with systems, devices and methods which are meant to be exemplary and illustrative, not limiting in scope. Specific configurations and details may be set forth in order to provide an understanding of the invention(s). However, it should be apparent to one skilled in the art that the invention(s) may be practiced without some of the specific details being presented herein. Furthermore, some well-known steps or components may be described only generally, or even omitted, for the sake of illustrative clarity.

Headings (typically underlined) may be provided as an aid to the reader, and should not be construed as limiting. Any dimensions and materials or processes set forth herein should be considered to be approximate and exemplary, unless otherwise indicated.

Various circuits comprising transistors may be described herein. The transistors may be field effect transistors (FETs) having three terminals: source (S), drain (D) and gate (G).

A voltage applied to the gate (G) controls current passing from source (S) to drain (D). This relationship between current and voltage may be referred to as "gain". FETs may be either "n-channel" or "p-channel" devices. A typical circuit using multiple FETS will typically use only one or the other of "n-channel" or "p-channel" devices, rather than mixing them. In the examples that follow, circuits using only one of "n-channel" or "p-channel" devices may be described, but it should be understood that the circuits may be implemented using the other of the "n-channel" or "p-channel" devices.

As may be used herein, a "unit cell" may refer to circuitry associated with a thermal emitter (or "pixel") element, and may be responsible for operating (driving) the pixel element. The unit cell circuitry may comprise a read-out integrated circuit (ROIC) or read-in integrated circuit (RIIC). There is typically one unit cell per pixel. There may be many pixel elements and associated unit cells in an infrared scene projector (IRSP).

Multi-Stage Current Drivers

Figure 1:
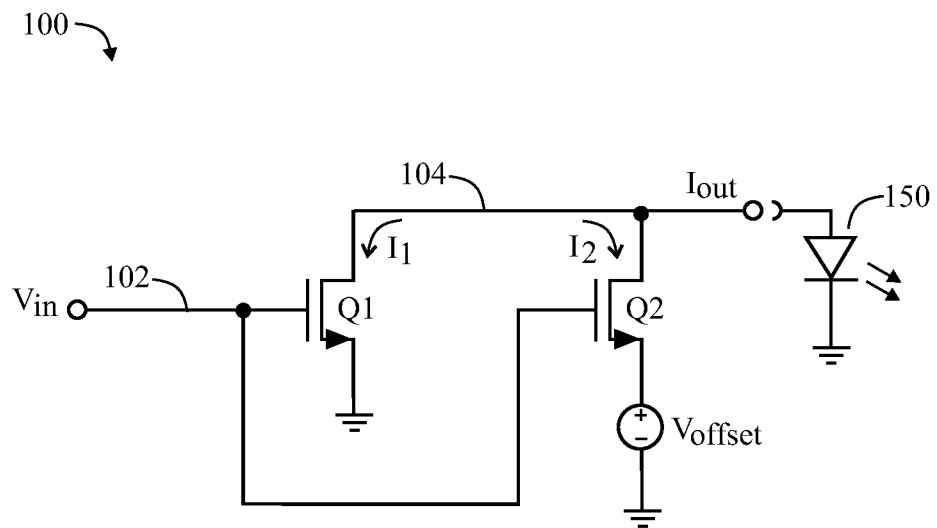
FIG. 1 is a schematic diagram illustrating an embodiment of a circuit for driving a LED-based IRSP.
Figure 2:
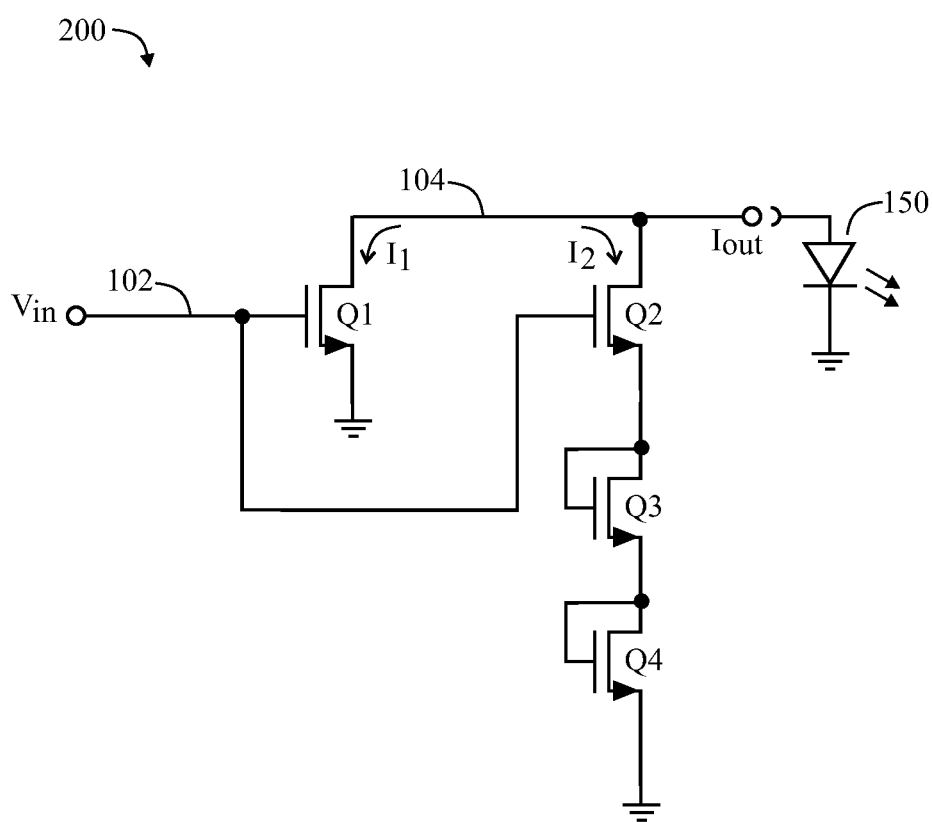
FIG. 2 is a schematic diagram illustrating an embodiment of a "two-stage" circuit for driving a LED-based IRSP.
Figure 3:
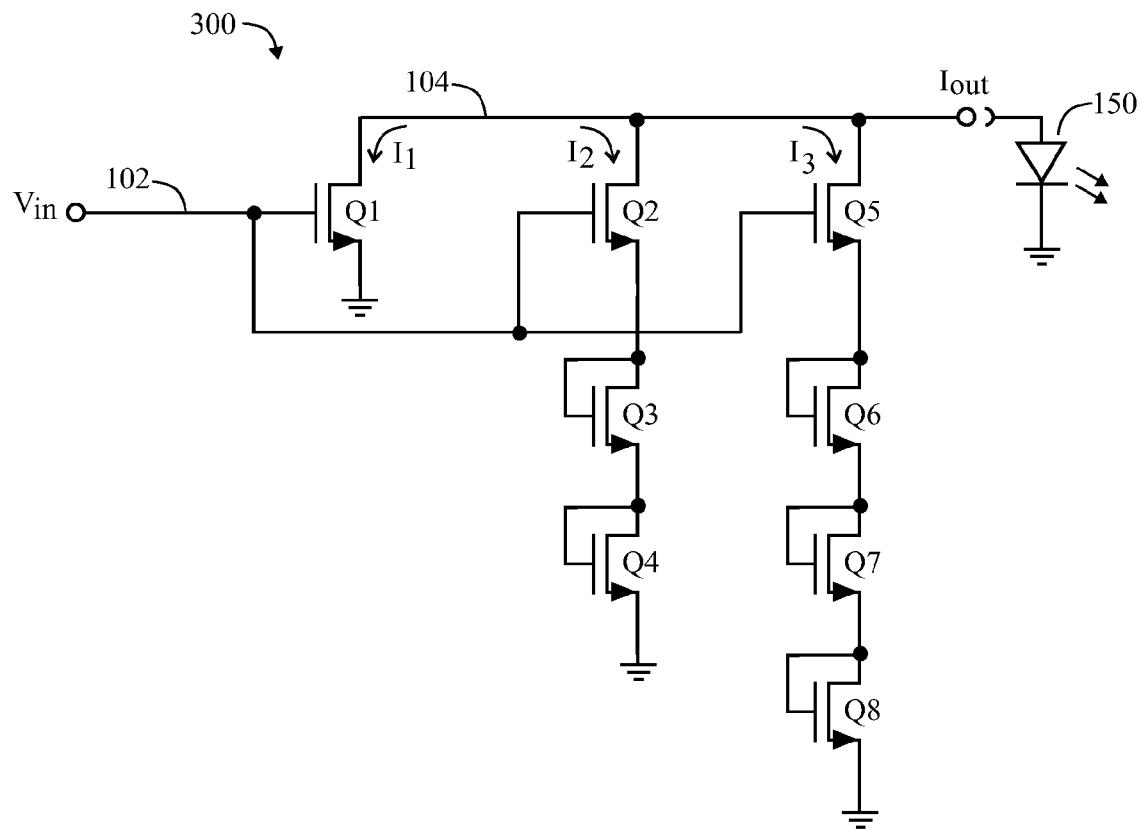
FIG. 3 is a schematic diagram illustrating an embodiment of a "three-stage" circuit for driving a LED-based IRSP.

Some techniques will be described herein to achieve a non-linear (or stepped) radiance versus input driver (current source) for a LED-based IRSP. FIGS. 1, 2, 3 illustrate examples of a techniques for providing a non-linear (or multi-step, or multi-stage) current driver having 2 or more gains for providing a current output for driving a single LED, wherein an input voltage produces an output current ($I_{out}$) with different gains as the input voltage ($V_{in}$) is increased.

FIG. 1 shows a drive circuit 100 for an LED 150. The LED 150 may be a thermal emitter of a pixel element in an IRSP. An input drive voltage $V_{in}$ on an input line 102 is applied to the gates of two transistors Q1 and Q2. The transistor Q1 has its drain connected directly to ground. An offset voltage source ($V_{offset}$) is provided. The transistor Q2 has its drain indirectly connected to ground, via the offset voltage source. This results in the transistors Q1 and Q2 turning on at different input voltages $V_{in}$. For example, the transistor Q1 may turn on and start providing an output current $I_1$ when the input voltage $V_{in}$ is approximately 0.5 v, and the transistor Q2 may turn on and start providing an output current $I_2$ when the input voltage $V_{in}$ is approximately 2.0 v. In this example, the offset voltage $V_{offset}$ is 1.5 v.

The sources of both transistors Q1 and Q2 are connected to an output line 104. The transistor Q1 outputs a current $I_1$. The transistor Q2 outputs a current $I_2$. The total output current $I_{out}$ supplied by the drive circuit 100 to the LED 150 is the sum of $I_1$ and $I_2$.

The transistor Q1 exhibits a gain $G_1$. The transistor Q2 exhibits a gain $G_2$. The gains, or transfer functions, of the transistors Q1 may be defined as a change in their output currents $I_1$ and $I_2$ for a given change in input voltage $V_{in}$. Each of the transistors Q1 and Q2 may be regarded as an independent current source, or as a separate stage of the overall drive circuit 100.

The drive circuit 100 described in FIG. 1 provides a non-linear (2 gains) output which may be applied to LED emitter arrays using single emitter (the LED 150) pixels driven by multiple parallel current sources (Q1 and Q2) and a single input voltage source ($V_{in}$).

The gains of the two transistors Q1 and Q2 may be different than one another. For example, the transistor Q2, may be physically much larger than the transistor Q1, and may have a consequently larger gain than the transistor Q1 (G2>G1), leading to a steeper slope of the current vs. voltage response that transistor relative to the one without the offset. The overall drive circuit 100 has a gain (or transfer function) G, which may be the defined as the sum of $G_1+G_2$. Some exemplary sizes and gains for the transistors Q1 and Q2 may be:

the transistor Q1 may have a size of approximately 10 μm², and may exhibit a gain $G_1$ of approximately 2 milliamps per volt, and the transistor Q2 may have a size of approximately 60 μm², and may exhibit a gain $G_2$ of approximately 5 milliamps per volt.

In this example, the gain G2 of the transistor Q2 is 2-3 times higher (larger, greater) than the gain $G_1$ of the transistor Q1.

The transistor Q2 may be significantly larger than the transistor Q1, and may exhibit a commensurately larger gain $G_2$ such as at least 5-10 times more, including hundreds and thousands times more (in other words, several orders of magnitude more) than the gain $G_1$ of the transistor Q1.

Alternatively, rather than the transistor Q2 being a single transistor which is significantly larger than the (single) transistor Q1, the transistor Q2 can be a plurality (or "gang") of transistors which may be similar to the transistor Q1, resulting in an overall larger gain $G_2$. Or, if the transistor Q1 is more than a single transistor, the transistor(s) Q2 are more transistors than the transistor(s) Q1. The overall objective is that the transistor(s) Q2 will exhibit a different (higher) gain than the transistor(s) Q1.

Figure 1A:
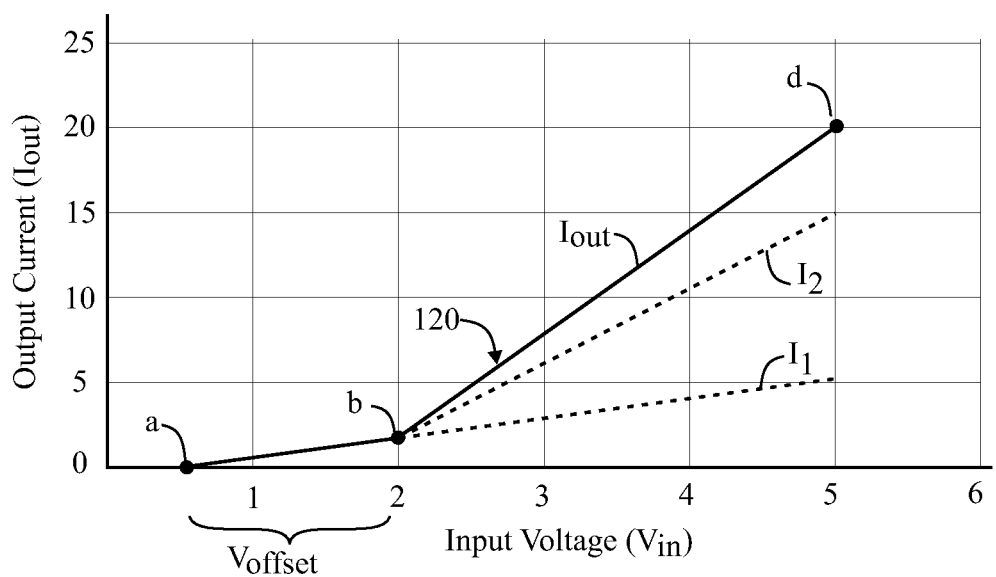
FIG. 1A is graph illustrating input voltage v. output current for the circuit of FIG. 1.

FIG. 1A is a graph illustrating output current ($I_{out}$) versus input voltage ($V_{in}$) for the circuit 100 of FIG. 1. A range of input voltages from 0-6 volts (V) and a range of output currents from 0-20 milliamps (mA) is shown. The slope of the line (curve) 120 represents the overall gain G of the circuit, or its output current ($I_{out}$) versus the applied input voltage ($V_{in}$). The voltage and milliamp values set forth herein are merely exemplary.

In a first "low end" range of input voltages (such as 0-2V), between the points "a" and "b" on the curve 120, the gain G of the circuit 100 (slope of the curve 120) has a first, low value which is established (controlled) substantially exclusively by Q1. (Between the points "a" and "b", G~=$G_1$.) The low slope of the curve in this range is indicative of high resolution for a low range of apparent temperatures, such as 150° K-400° K. In other words, low gain results in high (thermal) resolution.

In a second "high end" range of input voltages (such as 2-5V), between the points "b" and "d" on the curve 120, the gain G of the circuit 100 (slope of the curve 120) has a second, high value which is the sum of the larger gain $G_2$ of the transistor Q2 (or gang of transistors) Q2, plus the lower gain $G_1$ of the transistor Q1. When the gain $G_2$ of the transistor Q2 is significantly larger than the gain $G_1$ of the transistor Q1, the overall gain G of the circuit 100 will be dominated by Q2. The high slope of the curve in this range is indicative of low resolution for a high range of apparent temperatures, such as 400° K-1000° K. In other words, high gain results in low (thermal) resolution.

As illustrated by the graph of FIG. 1A, the transistor Q1 begins providing its output current $I_1$ at the point "a", such as 0.5 volts, and continues to provide its output current all the way to the point "d", such as 5 volts. The transistor Q2 begins providing its output current $I_2$ at the point "b", such as 2.0 volts, and continues to provide its output current all the way to the point "d", such as 5 volts. In this example, the point "b" is offset from the point "a" by the offset voltage $V_{offset}$, which may be 1.5 volts.

Having a high resolution in the low end range of input voltages (0-2 volts, in this example) and a low resolution in the high end range of input voltages (2-5 volts, in this example) allows for appropriate relative resolution in an IRSP system. For example:

in the range of 150° K-400° K, associated with the low end range of input voltages, a resolution of $1\times10^{-7}$ W/(cm²sr) may be achieved, and in the range of 400° K-1000° K, associated with the high end range of input voltages, a resolution of $2\times10^{-5}$ W/(cm²sr) may be achieved.

In the example provided above, the point "b", associated with the offset voltage $V_{offset}$ may be fixed (such as at 1.5 volts). This may correspond with an apparent temperature which is a fraction, such as approximately 20%, 30%, 40% or 50% (typically, less than half, such as approximately one-third) of the maximum apparent temperature. (For example, a breakpoint of 400° K corresponds with 20% of a 2000° K overall range.) The offset voltage $V_{offset}$ can, of course, be selected to establish virtually any desired "breakpoint" between a low end range of apparent temperatures with high resolution and a high end range of apparent temperatures with low resolution, while maintaining the desired overall dynamic range. It is within the scope of the invention that the "breakpoint", as established by $V_{offset}$, may be adjusted dynamically to address different situations. There is thus provided a drive circuit capable of providing selectable resolutions in different ranges of apparent temperature. And, although two distinct slopes have been described, it is within the scope of the invention that the slope may vary/increase gradually, rather than step-wise, from the bottom end of the range (point "a") to the cop end of the range (point "b").

FIG. 2 illustrates a drive circuit 200, which may be considered to be a variation of the drive circuit 100 of FIG. 1. An input drive voltage ($V_{in}$) is provided on a line 102, and an output current ($I_{out}$) is generated on the line 104. Two transistors Q1 and Q2 provide independent current sources ($I_1$ and $I_2$, respectively) for driving the LED 150 of a single LED emitter pixel in an emitter array for an IRSP.

In the drive circuit 200, rather than applying an offset voltage ($V_{offset}$) to the drain of the larger (higher gain) transistor(s) Q2, one or more (in this example, two) diode-connected transistors Q3 and Q4 are connected in series between the drain of the transistor Q2 and ground. The forward voltage drops of the two diode-connected transistors Q3 and Q4 establish the breakpoint "b" in a manner similar to that of the offset voltage ($V_{offset}$).

Although only two series-connected transistors (Q1 and Q2) are shown, only one, or more than two may be used to establish an appropriate breakpoint or multiple breakpoints between apparent temperature ranges of interest, and consequent different gains in the different ranges. If a two-step response such as described with respect to FIGS. 1 and 2 is not sufficient to achieve the desired range and resolution, additional steps (stages) can be added to the drive circuit.

FIG. 3 shows a three-stage driver circuit 300 which may be considered to be a variation of the drive circuit 200 of FIG. 2. An input drive voltage ($V_{in}$) is provided on a line 102, and an output current ($I_{out}$) is generated on the line 104. In this example, three transistors Q1, Q2 and Q5 provide independent current sources ($I_1$, $I_2$ and $I_3$, respectively) for driving the LED 150 of a single LED emitter pixel in an emitter array for an IRSP.

The transistor (or current source) Q1 may be directly connected to ground, as in the drive circuits 100 and 200. The transistor (or current source) Q2 may be indirectly connected to ground via two diode-connected transistors Q3 and Q4, connected in series with one another, and establishing a first offset voltage ($V_{offset}$), as in the drive circuit 200. The transistor (or current source) Q5 may be indirectly connected to ground via three diode-connected transistors Q6, Q7 and Q8, connected in series with one another, and establishing a second offset voltage ($V_{offset}2$). The transistor (or gang of transistors) Q2 may have a gain G2 which is greater than the gain G1 of the transistor Q1. The transistor (or gang of transistors) Q5 may have a gain G3 which is greater than the gain G2 of the transistor Q2. (The transistor Q5 may be physically larger than, or may comprise more transistors than, the transistor Q2.) In this manner, three ranges of input voltages may each have different gains, resulting in different resolutions in the different ranges.

Figure 3A:
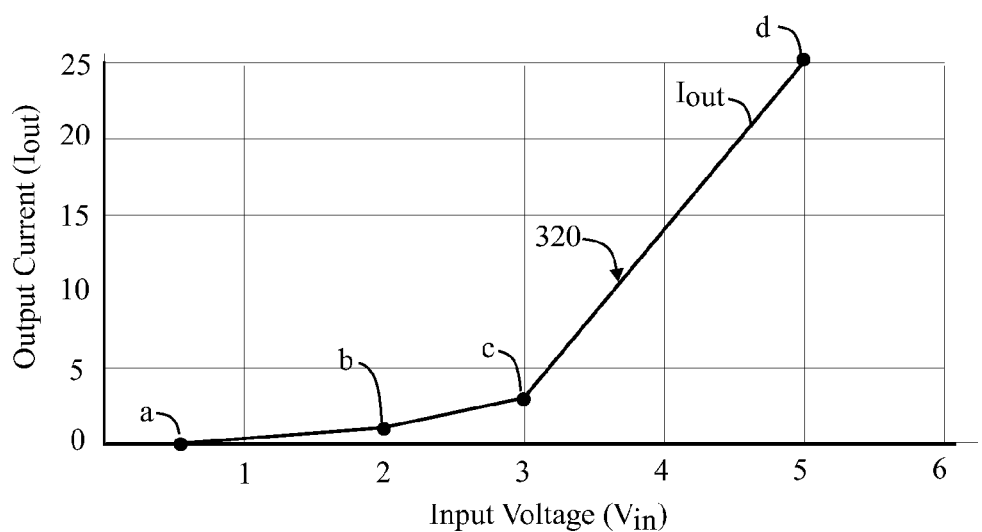
FIG. 3A is graph illustrating input voltage v. output current for the circuit of FIG. 3.

FIG. 3A is a graph illustrating output current ($I_{out}$) versus input voltage ($V_{in}$) for the circuit 300 of FIG. 3. A range of input voltages from 0-6 volts (V) and a range of output currents from 0-20 milliamps (mA) is shown. The slope of the line (curve) 320 represents the overall gain G of the circuit, or its output current ($I_{out}$) versus the applied input voltage ($V_{in}$). The voltage and milliamp values set forth herein are merely exemplary.

In a first "low end" range of input voltages (such as 0-2V), between the points "a" and "b" on the curve 120, the gain G of the circuit 300 (slope of the curve 320) has a first, low value which is established (controlled) substantially exclusively by Q1. This is similar to FIG. 1A, and the drive circuits 100 and 200. The low slope of the curve in this range is indicative of high resolution for a low range of apparent temperatures.

In a second "middle" range of input voltages (such as 2-3V), between the points "b" and "c" on the curve 120, the gain G of the circuit 300 (slope of the curve 320) has a second, higher value which is the sum of the gain $G_2$ of the transistor(s) Q2, plus the gain $G_1$ of the transistor Q1. The higher slope of the curve in this range is indicative of a lower resolution for the middle range of apparent temperatures. The point "b" represents a first breakpoint between the low end and middle ranges.

In a third "high end" range of input voltages (such as 3-5V), between the points "c" and "d" on the curve 120, the gain G of the circuit 300 (slope of the curve 320) has a third, yet higher value which is the sum of the gain $G_3$ of the transistor(s) Q5, plus the gain $G_2$ of the transistor(s) Q2, plus the gain $G_1$ of the transistor(s) Q1. The yet higher slope of the curve in this range is indicative of a yet lower resolution for the high range of apparent temperatures. The point "c" represents a second breakpoint between the middle ad high end ranges. (Whereas the first breakpoint "b" was mentioned as being at approximately one-third of the overall range, the second breakpoint "c" may be at approximately two-thirds of the overall range, by way of example.)

This concept of adding current sources (exemplified by Q1, Q2 and Q5), with subsequently higher gains, and setting breakpoints (exemplified by "b" and "c") to separate ranges of apparent temperatures could be continued with as many stages as can fit in the allotted area of the circuit (unit cell). And any number of "offset" transistors (exemplified by Q3/Q4, Q6/Q7/Q8) can be used to establish the breakpoints (turn on voltages for the different stages).

Multi-LED Unit Cells

Another solution to the range/resolution problem is to provide a multi-LED unit cell. In this design, the unit cell contains multiple (2 or more) LEDs driven with the same input voltage. The LEDs may have different sizes, hence different radiance. For simplicity, a two LED circuit is presented here. The concept could be expanded to use more than two LEDs per unit cell, if necessary. Each LED may have its own driver stage.

Figure 4:
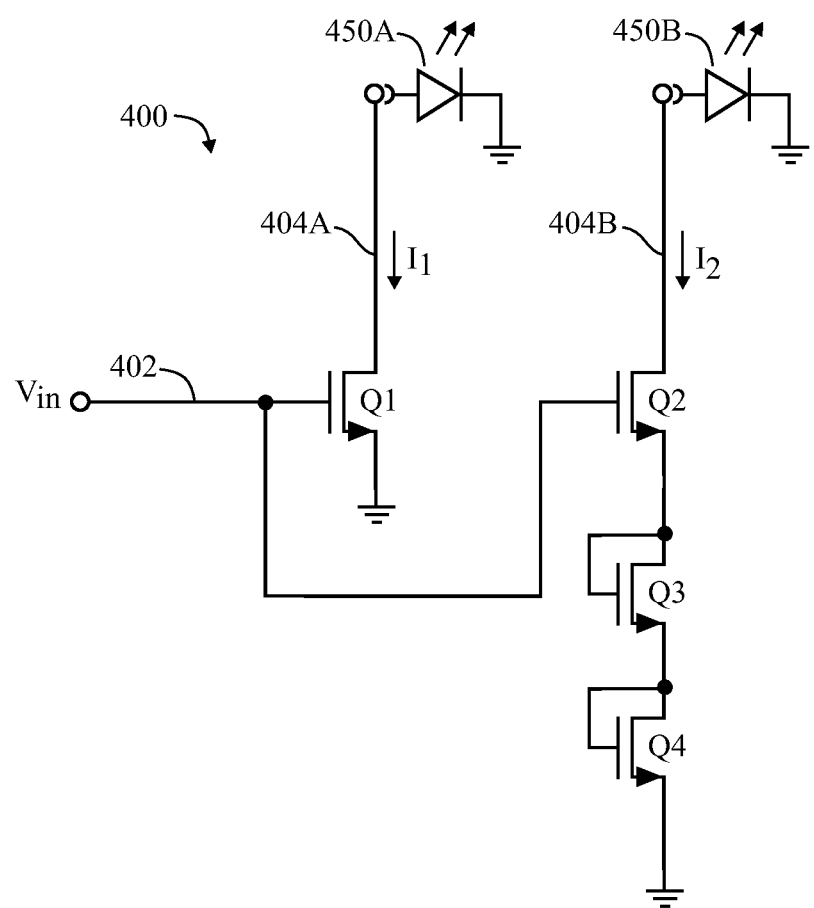
FIG. 4 is a diagram illustrating an embodiment of a "two-stage" circuit for driving a LED-based IRSP having at least two different LEDs per pixel.

The smaller LED is designed to produce substantially less radiance than the larger one. For example, the larger LED may have a few orders of magnitude greater radiance than the smaller LED. The larger LED may be implemented as a plurality (gang) of smaller LEDs (in the manner that the larger higher-gain transistor Q2 may be implemented.) The larger LED is designed with an offset on the input relative to the smaller LED such that the smaller LED begins to emit first. This produces a two-step output, allowing the improved resolution at low radiance values. FIG. 4 shows a schematic of the concept.

This method is more complicated, requiring a second LED and at least one more contact between the read-in-integrated-circuit (RIIC) and LED, but should have less temperature dependence at low radiance.

FIG. 4 illustrates a drive circuit 400, which is similar in some respects to the drive circuit 200 of FIG. 2. An input drive voltage ($V_{in}$) is provided on a line 102. Two transistors Q1 and Q2 provide independent current sources/stages ($I_1$ and $I_2$, respectively). The transistor Q1 is connected directly to ground (as in FIG. 2). The transistor Q2 is connected indirectly to ground via two diode-connected transistors Q3 and Q4, connected in series with one another, to offset the turn-on voltage of the transistor Q2 (as in FIG. 2). The transistor Q2 could be connected to ground via an offset voltage $V_{offset}$ (as in FIG. 1).

In the FIG. 2 embodiment, the output currents $I_1$ and $I_2$ of Q1 and Q2 (the two current drivers, or driver stages) are combined with one another ($I_{out}$) and drive a single LED (150). In this FIG. 4 embodiment, the output currents $I_1$ and $I_2$ of Q1 and Q2 (the two current drivers, or driver stages) are not combined with one another, but rather are each independently provided to a respective one of two LEDs 450A and 450B of a pixel cell, on separate output lines 404A and 404B, respectively.

The transistor Q2 may be larger than and may have a larger gain $G_2$ than the gain $G_1$ of the transistor Q2 (as in FIG. 2). The LED 450B may be larger than and have greater luminance than the LED 450A. This combination of higher gain transistor (current source) Q2 and greater luminance LED 450B may increase the slope of apparent temperature versus input drive voltage ($V_{in}$) more dramatically than in the previously-described driver circuits (100, 200 and 300) which are driving a single LED (150).

Figure 4A:
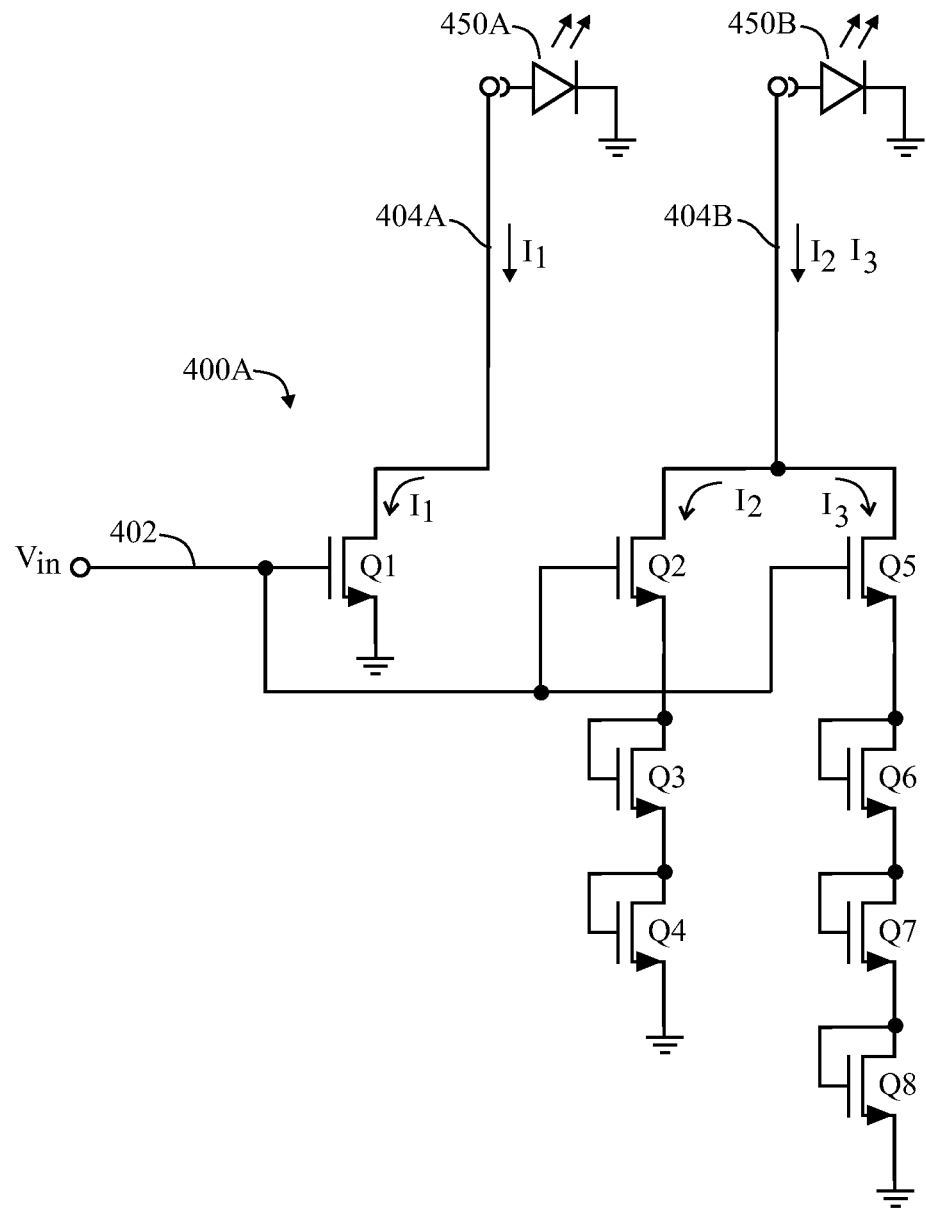
FIG. 4A is a diagram illustrating an embodiment of a "three-stage" circuit for driving a LED-based IRSP having at least two different LEDs per pixel.

FIG. 4A illustrates a variation of a drive circuit 400A, sharing some elements in common with the drive circuit 400 of FIG. 4. In this embodiment, rather than having a two-stage drive circuit driving two LEDs (450A, 450B), a three-stage drive circuit may be used. In this embodiment, the circuit of FIG. 3 is essentially modified to have two output lines 404A and 404B driving the two LEDs 450A and 450B.

FIGS. 4 and 4A show two LEDs per pixel, which can establish two ranges of apparent temperatures (and resolutions). The concept can be extended to three or more LEDs per pixel.

The method(s) of improving resolution for LED arrays described herein may also be applied to arrays based on other thermal emitters for IRSPs, such as resistive arrays, superlattice LEDs and lasers.

While the invention(s) has/have been described with respect to a limited number of embodiments, these should not be construed as limitations on the scope of the invention(s), but rather as examples of some of the embodiments. Those skilled in the art may envision other possible variations, modifications, and implementations that are also within the scope of the invention(s), based on the disclosure(s) set forth herein.

What is claimed is:

1. A drive circuit for an LED-based thermal emitter of an infrared scene projector (IRSP) comprising:
   an input line for receiving a voltage input (Vin);
   at least one output line for providing corresponding at least one output current (Iout, I1, I2) to at least one LED in a pixel of the IRSP;
   a first transistor (Q1) having a first gain (G1) and providing a first output current (I1) to the at least one LED in response to the voltage input (Vin);
   a second transistor (Q2) having a second gain (G2) and providing a second output current (I2) to the at least one LED in response to the voltage input (Vin);
   wherein:
   the second gain (G2) of the second transistor (Q2) is larger than the first gain (G1) of the first transistor (Q1); and
   a first offset voltage is applied to the second transistor (Q2) to establish a first breakpoint between a low end range of apparent temperatures with high resolution and a higher range of apparent temperatures with lower resolution.

2. The drive circuit of claim 1, wherein:
   the second gain (G2) is at least 10 times larger than the first gain (G1).

3. The drive circuit of claim 1, wherein:
   the second transistor (Q2) comprises a plurality of transistors.

4. The drive circuit of claim 1, further comprising:
   a third transistor (Q5) having a third gain (G3) and providing a third output current (I3) in response to the voltage input (Vin).

5. The drive circuit of claim 4, wherein:
   the first offset voltage establishes the first breakpoint between a low end range and a medium range of apparent temperatures; and
   a second offset voltage establishes a second breakpoint between the medium range and a high end range of apparent temperatures.

6. The drive circuit of claim 5, wherein at least one of the first and second offset voltages is established by at least one diode-connected transistor (Q3/Q4; Q6/Q7/Q8).

7. The drive circuit of claim 1, wherein:
   the first offset voltage is established by a voltage source.

8. The drive circuit of claim 1, wherein:
   the LED functions as a thermal emitter pixel of an infrared scene projection system (IRSP), wherein there are a plurality of LEDs and a corresponding plurality of pixels;
   the IRSP has a range of apparent temperatures; and
   the offset voltage establishes/separates a low end range of apparent temperatures from a high end range of apparent temperatures.

9. The drive circuit of claim 8, wherein:
   the IRSP exhibits a high resolution in the low end range of apparent temperatures and exhibits a relatively low resolution in the low end range of apparent temperatures.

10. The drive circuit of claim 8, wherein:
    the low end range of apparent temperatures is below 400° K; and
    the high end range of apparent temperatures is above 400° K.

11. The drive circuit of claim 1, wherein:
    at least one pixel of the IRSP comprises at least two LEDs; and
    the first and second output currents are provided individually to selected ones of the at least two LEDs.

12. The drive circuit of claim 11, wherein:
    selected ones of the at least two LEDs is driven by its own driver stage.

13. The drive circuit of claim 11, wherein:
    one of the at least two LEDs is larger than another of the at least two LEDs.

14. Method of driving at least one thermal emitter of an infrared scene projector (IRSP) comprising: characterized by
    driving the at least one thermal emitter in a first range of apparent temperatures with high resolution; and
    driving the at least one thermal emitter in a higher range of apparent temperatures with lower resolution.

15. The method of claim 14, wherein the at least one thermal emitter comprises one or more LEDs.

* * * * *